United States Patent [19]

Erwin

[11] 3,933,567
[45] Jan. 20, 1976

[54] APPARATUS FOR HEAT BONDING FLUOROCARBON AND OTHER PLASTIC FILMS TO METAL SURFACES

[75] Inventor: Ransome W. Erwin, Ogden, Utah

[73] Assignee: Austral-Erwin Engineering Co., Houston, Tex.

[22] Filed: Aug. 1, 1974

[21] Appl. No.: 493,890

Related U.S. Application Data

[60] Division of Ser. No. 401,656, Sept. 28, 1973, and a continuation-in-part of Ser. No. 311,137, Dec. 1, 1972, which is a continuation of Ser. No. 41,375, May 28, 1970, abandoned.

[52] U.S. Cl. ............... 156/382; 156/390; 156/497; 156/498; 156/499; 156/543
[51] Int. Cl.² ........................................ B32B 15/08
[58] Field of Search ........... 156/285, 286, 382, 499, 156/446, 390, 497, 498, 543; 117/107.2 P

[56] References Cited
UNITED STATES PATENTS

| | | | |
|---|---|---|---|
| 3,163,553 | 12/1964 | Commanday et al. | 117/107.2 P |
| 3,222,212 | 12/1965 | Samuel et al. | 117/107.2 P |
| 3,356,549 | 12/1967 | King | 156/382 |
| 3,449,159 | 6/1969 | Baldi | 117/107.2 P |
| 3,532,575 | 10/1970 | Nagata et al. | 156/286 |
| 3,533,870 | 10/1970 | Mackay et al. | 156/286 |
| 3,619,322 | 11/1971 | Fleissner | 156/285 |
| 3,764,430 | 10/1973 | Schrenk | 156/390 |
| 3,811,988 | 5/1974 | Fleissner | 156/498 |

Primary Examiner—Douglas J. Drummond
Assistant Examiner—Jerome W. Massie

[57] ABSTRACT

The method of adhering a preformed continuous film of fluorcarbon plastic material to a flat or convex metal surface which comprises heating both the metal surface and a layer of the plastic material superposed upon the metal surface in a gaseous environment of reduce pressure sufficiently to soften the plastic film and bond the same to the metal surface employing multiple steps of heating, bonding and cooling without application of increased pressure to the outer surface of the heated plastic film to form a bonded metal-plastic combination without entrapment of gas. The invention is particularly adapted to the bonding of fluorocarbon plastic material to surfaces of metal such as aluminum, iron, iron alloys, copper, and copper alloys.

11 Claims, 12 Drawing Figures

FIG. 8 (MODIFIED)

INERT GAS

FIG. 9.

FIG. 11. (MODIFIED)

FIG. 12

APPARATUS FOR HEAT BONDING FLUOROCARBON AND OTHER PLASTIC FILMS TO METAL SURFACES

RELATED APPLICATIONS

This is a division of Ser. No. 401,656, filed Sept. 28, 1973.

This application is a continuation-in-part of my application Ser. No. 311,137 filed Dec. 1, 1972 which in turn is a continuation of my application Ser. No. 41,375, filed May 28, 1970, now abandoned. The present application is also related to and is a continuation-in-part of Ser. No. 246,220, filed Apr. 21, 1972 which is a division of Ser. No. 41,375 and is also related to and is a continuation-in-part of Ser. No. 371,346, filed June 19, 1973 which is a division of Ser. No. 246,220, filed Apr. 21, 1972.

EXPLANATORY INFORMATION

In my U.S. patent application Ser. No. 41,375 filed May 28, 1970 entitled "Improvements In The Preparation Of Plastic-Metal Products, Including Laminates, Composite Tubes And The Like", I disclose a novel method of heat bonding fluorocarbon plastic films, particularly DuPont hexafluoropropylenetetrafluoroethylene also known as FEP, to metal surface without employment of bonding additives or application of pressure to the outer surface of the plastic film, and without entrapment of air between the metal surface and the film, performing the heating and bonding in an environment of nearly perfect vacuum. (See page 8, lines 5-21 of application as filed). As Objects of Invention I disclosed the use of very high vacuum to:

1. Minimize oxidation of metals such as iron, many of its alloys, copper and many of its alloys, which are subject to oxidation at the required bonding temperatures of the fluorocarbon plastic films employed, thereby providing a means for heat bonding such fluorocarbon plastic films to such oxidizable metal; aluminum posing no such problem by not being oxidizable within the bonding temperature ranges of the film;

2. Provide heat bonding of a fluorocarbon plastic film to a metal surface with substantially perfect bonding contact without entrapment of air or other gases between the film and the metal surface. As disclosed on page 22 lines 3-11 of the above specification, the stated amount of vacuum required was in a pressure range of 0.1 to 0.01 MM of mercury. This is a very high degree of vacuum though appreciably less than the 0.001 MM attainable with modern vacuum fore pumps which are too expensive and not practicable for commercial operations.

In performing the methods and procedures disclosed by above Ser. No. 41,375, the only methods of record for doing such at that time, I found aluminum to bond excellently to the FEP. I found carbon steel and stainless steel to bond fairly well, but not nearly so strongly as aluminum, this being due to slight oxidation of the steel materials even in high vacuum, whereas aluminum was immune to this. I found copper and high copper alloys to bond, but with a bond appreciably less than that of carbon steel or stainless steel, as its oxidation product adhered very poorly to the mother metal and readily peeled off, impregnating the FEP film. Seemingly, the blue iron oxides formed in rarified oxygen (air) bonded much more firmly to the mother metal than did the yellowish-green copper oxides. Under conditions of atmospheric pressure, black copper oxide formed and gave sero bond to the FEP, whereas steel materials bonded fairly well to FEP, though not nearly so strong as in a high vacuum.

I also found that even when using the maximum vacuum attainable (less than 0.1MM) with my equipment, there were always a number of small, scattered unbonded spots, usually less than 2% of the total surface, these due to entrapped rarified air spaces between the FEP film and the metal surface. Most of these tests were conducted with think 6 mil aluminum sheet and 1 mil FEP. These unbonded spots were always present when using bonding temperatures ranging from 525° to 650°F, no matter whether the laminate was kept in this bonding temperature and maximum vacuum attainable for a few minutes or several hours. If higher temperature ranges such as 650° to 750°F were employed, most of the air spaces burst, leaving exposed metal surface spots, but with the FEP very firmly bonded elsewhere. Although the foregoing method produced an imperfect laminate, it was better than any other known method of heat bonding, and since my primary objective was a zero water wetting surface rather than a corrosion resistant system, the few broken spots in the bonded film could be tolerated, especially for aluminum-FEP laminates. Thus, the process and method as taught in Ser. No. 41,375 was quite useful for coating aluminum with FEP, but was more limited in bond strength with carbon steel and stainless steel, and fairly useless with copper and high copper alloys.

After filing Ser. No. 41,375 and continuing with perfecting of the method and process it discloses, I found a novel solution to the air space, film rupture, and oxidation problems which is the subject of this invention. However, before disclosing the steps that describe this novel solution, the steps previously employed in Ser. No. 41,375 should be outlined as follows:

1. Place an unbonded film of FEP fluorcarbon plastic superposed on a metal surface in a vacuum-heating oven before subjecting it to reduced pressure or superpose the film onto the metal surface in the oven while the oven is in a state of reduced pressure;

2. Exhaust all air possible with a vacuum pump;

3. Heat the fluorocarbon film and metal surface to the expanding temperature range of the FEP usually 300° to 450°F, permitting substantially all of the air to escape from the space between the expanding film and the metal surface;

4. Continue elevation of the temperature from 450°F on up to a range of 525° to 650°F at which temperature the FEP film shrinks, becomes adhesive and bonds to the metal surface;

5. Hold the temperature in this strong bonding range for approximately 30 minutes to assure firm, maximum bonding;

6. Cool the bonded combination down to 300°F or less;

7. Admit air to the vacuum oven and remove the FEP bonded metallic object or material.

This procedure always produced a good bond, but one which always contained scattered unbonded, small areas with some ruptured spots of film exposing metal surface, these failure spots being more numerous with higher bonding temperatures with, of course, proportionately less unbonded air spaces. Many attempts were made to eliminate or minimize these failure or unbonded spots, with varying degree of success, but were never fully satisfactory. Efforts to squeeze out the air were made by progressively heating the surface from one edge of an area to another, progressively expanding the FEP film on the area and bonding it, producing partial but not complete success.

The solution to the problem and subject of this patent application came about as follows: Because of profuse wastage of thin aluminum strip material and FEP film used in the many attempts to produce a perfect bonded surface, I decided to use the naked side of a laminate of aluminum and poorly bonded FEP film for another attempt at bonding, going through the above mentioned steps. The newly bonded film had the usual scattering of air spaces and failure spots, but it was observed that all of the air spaces in the old bond, which had now had two cycles of heating, bonding and cooling, had completely disappeared. Since there were no ruptures or breaks in the FEP where the air spaces formerly existed, it could be only concluded that the air had passed through the expanded pores of the unbonded portion of FEP prior to its bonding during the 2nd heating and cooling step. It should be noted that once FEP is bonded to a metal surface, it does not go through the expansion and shrinking stages with increasing temperature as does unbonded FEP. The logical question to this is: Why did it not occur to the inventor to try such a 2nd step of heating, bonding and cooling early in the history of the failures? The answer: although it was known to the inventor that the FEP film was somewhat porous and not fully impervious to fluids, it just did not seem plausible that this entrapped air could be squeezed through these pores under these conditions; the air was firmly entrapped under the spot of film, fully surrounded by a firm bonded seal of FEP to the metal, and it was believed could be removed only by a rupture in the film as was indicated by the ever present rupture spots mixed among the unbonded air space spots in all previous tests.

After the discovery that a single repeating of the heating, bonding and cooling step in an environment of reduced pressure effected complete elimination of the entrapped air spaces, many tests were conducted to determine the minimum vacuum requirement, the temperature requirements for each step, and the time required to effect a strong, air-space-free and rupture-free bond of FEP to a metal surface. Bonding 0.001 inch FEP film to 0.006 inch thin aluminum sheet, it was found that approximately 18 inches of mercury vacuum was the lower limit of vacuum permitting production of a rupture-free and air-space-free complete bond, using the aforedescribed two step heating, bonding and cooling procedure. When lower vacuums (using the term "low" to mean approaching atmospheric pressure) were tried, total air space removal was not possible. Since higher vacuums such as 20 to 24 inches of mercury could be attained as readily as 18 inches, this lower limit was not used, simply as a precautionary measure to assure a complete bond, therefore, on all of my tests 20 to 24 inches of mercury vacuum was employed. When heat bonding FEP film to metal surfaces it was found that operating in lower vacuum ranges such as 18 to 26 inches of mercury, where entrapped air or gases would be considerably denser than that in extreme high vacuum, it was most important to utilize minimum bonding temperatures in the 1st heating, bonding and cooling step to avoid rupture of the unbonded portion of film entrapping the gas, such ruptures always appearing as exposed metal spots after the 2nd heating, bonding and cooling step.

Such ruptures at highter temperatures is the result of a dual effect:

1. Increased softening and weakening of the FEP at higher temperatures, and
2. Increased pressure of the entrapped gas due to expansion at higher temperatures.

I found that in environments of 22 to 26 inches of mercury vacuum, DuPont FEP type "A" or "C" 0.001 inch thick film became progressively more adhesive to metal in a temperature range of 500° to 525°F, this probably being so in environments of other pressures. By avoiding temperatures in excess of approximately 525°F during the 1st heating, bonding and cooling cycle, a burst free coating or bonding, the total area containing approximately 1 to 5% unbonded air spaces, was usually achieved with this 1st step.

After this 1st step, repeating the heating, bonding and cooling in a 2nd step, employing bonding temperatures of a range of 550° to 650°F to effect a maximum bond strength, a maximum bond of the FEP to the metal surface, totally free of bursts and air spaces, was achieved. I found that use of temperatures from 525°F upwards in the 1st heat, produced progressively numerous bursts as the temperature was raised in the heating, bonding and cooling procedure, each air space eventually rupturing at higher temperatures. For this reason I chose 525°F as a good, safe maximum temperature for the 1st heat, no matter what degree of vacuum was used for the system. After it was learned that near 100%, bonding could be effected using the two steps of heating, bonding and cooling with comparatively low vacuums such as 18 to 26 inches of mercury vacuum, it then became feasible to inject an inert gas such as nitrogen into the vacuum oven, displacing oxygen with appreciable passage of nitrogen, yet with no problems of entrapped gas under the FEP film. By operating at these lower vacuums, thereby enabling near total elimination of air leaks, and using the nitrogen to sweep out all oxygen, it became possible for the first time, so far as I know, to firmly bond FEP film to copper metal without the formation of deleterious copper oxide or the entrapment of gas under portions of the FEP film, using only heat for the bonding. This method also made possible the achievement of maximum bonding of FEP to carbon steel and stainless steels. In those operations that require total absence of oxygen from the rarified gases contacting the heat bonding combination of FEP film and a metal surface, and where it is difficult or impossible to sufficiently minimize air leakage into the vacuum oven, a novel solution to this problem is disclosed in this invention. It consists of the use of an inner inert gas heating and bonding chamber within the outer vacuum chamber, into which inner chamber the inert gas such as nitrogen is introduced, flooding the inner chamber and escaping through a small opening into the outer chamber. The space between the outer chamber and the inner chamber acts as a conduit to convey leaked-in air to the outlet to the vacuum pump source, thereby completely by-passing the inner chamber, which has a rarified inert gas pressure slightly greater than the rarified air pressure in the annular space without permitting any oxygen to enter the inner chamber. A more detailed description of this is disclosed in the DESCRIPTION section of this application.

As suggested in the foregoing narration and explanation, among the chief Objects of Invention in this disclosure are the following:

1. To heat bond a fluorocarbon film such as DuPont's FEP to a metal surface without use of bonding cements or application of pressure to the outer surface of the heated film; performing this bonding in a gaseous environment of sub-atmospheric pressure with near total elimination of gas entrapment between the film and the metal surface by employment of multiple heating, bonding and cooling steps; such metal surface being any flat or covex surface of metallic objects or material such as pipe, rods bars, vessels, plate, strips, sheets, valves, fittings, wire, and other metallic components or apparatus that permit subjection to such an environment of reduced pressure and heating.

2. To accomplish (1) on all metals commonly used in industry, whether unoxidizable at the FEP bonding temperatures, such as aluminum, or oxidizable at such bonding temperatures, including such metals as copper and copper alloys, iron, carbon steel and stainless steels.

3. To accomplish object (2) on metals oxidizable at the bonding temperature of the FEP, using an inert gas such as nitrogen to purge the vacuum oven of original in-place air and dilute and remove air entering the oven by leakage, the predominant presence of the inert gas preventing sufficient oxidation of the metal surface to be deleterious to strong bonding of the FEP film to the metal surface. This use of an injection of inert gas is made possible by the novel method of multiple heating, bonding and cooling steps which permit gas entrapment-free bonding of FEP to metal surfaces in environments of vacuum substantially lower than what is considered "high vacuum".

4. To accomplish object (3) wherein even traces of oxygen are intolerable in contact with the heated metal surface, this being accomplished by the use of an inner vacuum tank within an outer vacuum tank, the inner tank housing the FEP film and metal surface to be bonded and receiving the inert gas which flows into it and then out into the outer vacuum tank, thence with leaked-in air to the vacuum pump source, the pressure in the inner vacuum tank always being slightly greater than that of the outer vacuum tank to assure flow of inert gas to the vacuum source and obviate any possible entry of leaked-in air to the inner vacuum tank, this method also being applicable to plastics other than FEP.

5. To provide a novel method of producing a maximum strength, burst free, total bonding of a fluorocarbon film such as DuPont FEP to a metal surface, using heat only, in a gaseous environmental pressure substantially greater than 0.1MM of mercury and less than one-half atmosphere, using multiple steps of heating, bonding, and cooling.

6. To provide object (5) for most metals and metal alloys, both oxidizable and unoxidizable in the bonding temperature range of the FEP.

7. To provide a novel and simple method of removing substantially all entrapped gases from unbonded gas spaces beneath FEP film partially heat bonded to a metal surface, without rupturing the unbonded film, and subsequently achieving total bonding of the previously unbonded portions of FEP film, using multiple steps of heating, bonding, and cooling of the combination of FEP film and metal surface.

Figure 8:
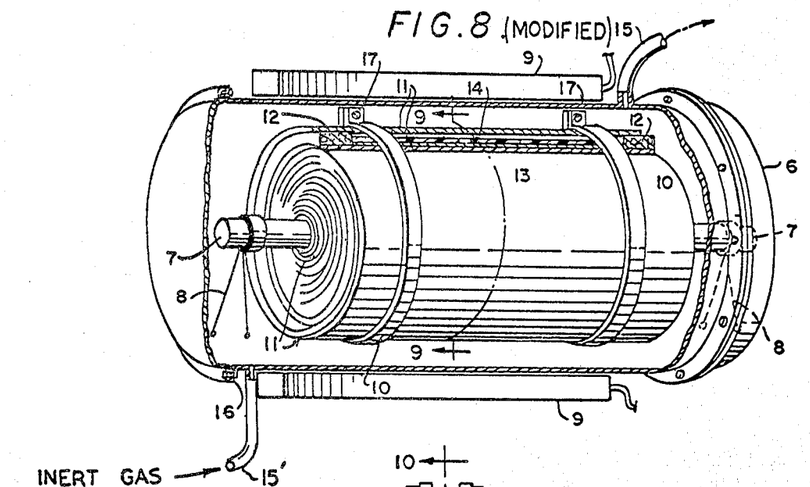
FIG. 8 is a side view partly in section of a heating vessel or container subjected to a vacuum pump or the like and having suspended therein a composite roll of plastic and metal sheets to be subjected to a heat bonding operation under subatmospheric pressure conditions.
Figure 9:
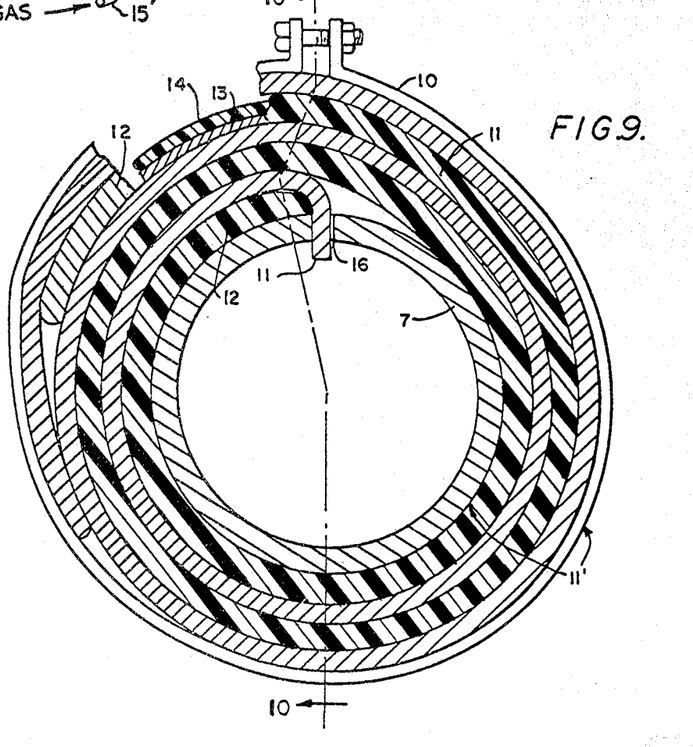
FIG. 9 is a transverse sectional view of line 9—9 through the composite roll of FIG. 8 on a larger scale than in FIG. 8 and with the core shown proportionately much larger than in FIG. 8.
Figure 10:
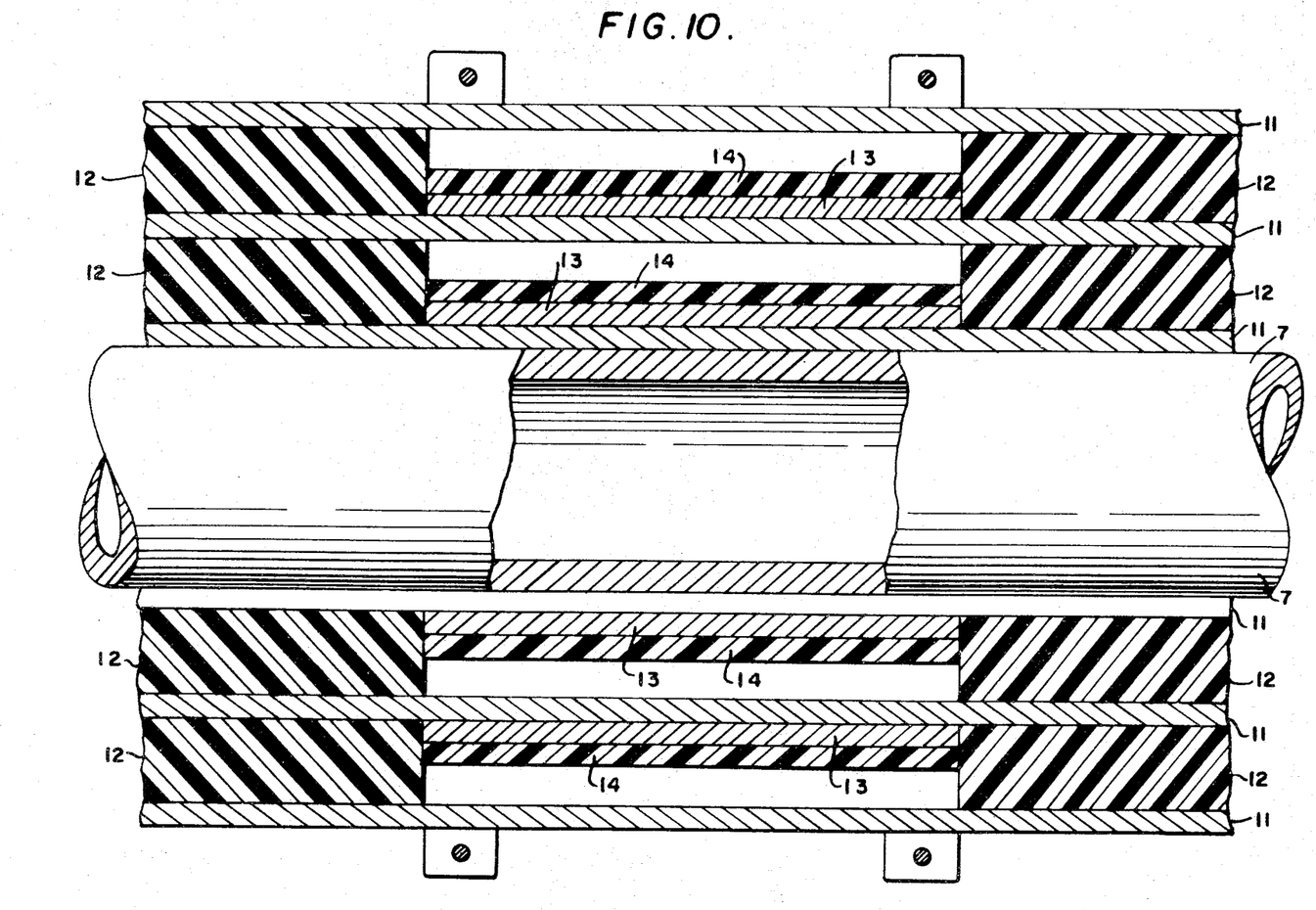
FIG. 10 is a longitudinal sectional view of the composite roll of FIG. 8 and on a larger scale taken on line 10—10 of FIG. 9 and showing the spacer strips of FIG. 8 on each end of the composite roll, the core also being shown enlarged as compared with that of FIG. 8 but of somewhat less porportional size than in FIG. 9.

8. Improve the method of heat bonding a pre-formed coil of FEP film and thin metal sheet laminate in an environment of vacuum as depicted by FIGS. 8–10 inclusive in my application Ser. No. 41,375 and pages 20–22 of the specification thereof, wherein comparatively high vacuums of 0.1 to 0.01MM mercury pressure are recommended and only a single step of heating, bonding and cooling is employed. This improvement consists of: (a) using multiple steps of heating, bonding and cooling in an environment of moderate vacuum, considerably less than the high vacuum taught in Ser. No. 41,375, to achieve a more complete bonding area without bursts in the FEP film, such vacuum being in a range of 18 to 26 inches of mercury, and (b) injection of an inert gas into the system when coating an oxidizable metal, to assure good oxide-free bonding of the FEP film to the metal surfaces at the oxidizing temperatures of the metal, an inlet 15' for such inert gas depicted in FIG. 8 of the drawing.

9. Another object of this invention is to improve the method of heat bonding plastic films of FEP to both sides of a metal strip in a continuous operation wherein the film is continuously applied to the moving metal strip in an environment of high vacuum as taught in my application Ser. No. 41,375, wherein the need for such high vacuum is now eliminated, such improvements being as follows: (See FIG. 11 of the drawing). (a) The addition of multiple steps of heating, bonding and cooling to replace all single such steps, in an environment of vacuum considerably less than that taught in Ser. No. 41,375, and achieving a more perfect, entrapped air-free and rupture-free bonding of the FEP film to the metal; (b) employment of inert gas injection into the system to minimize metallic oxide formation on the surfaces of metals normally subject to oxidation at the required bonding temperatures.

Figure 11:
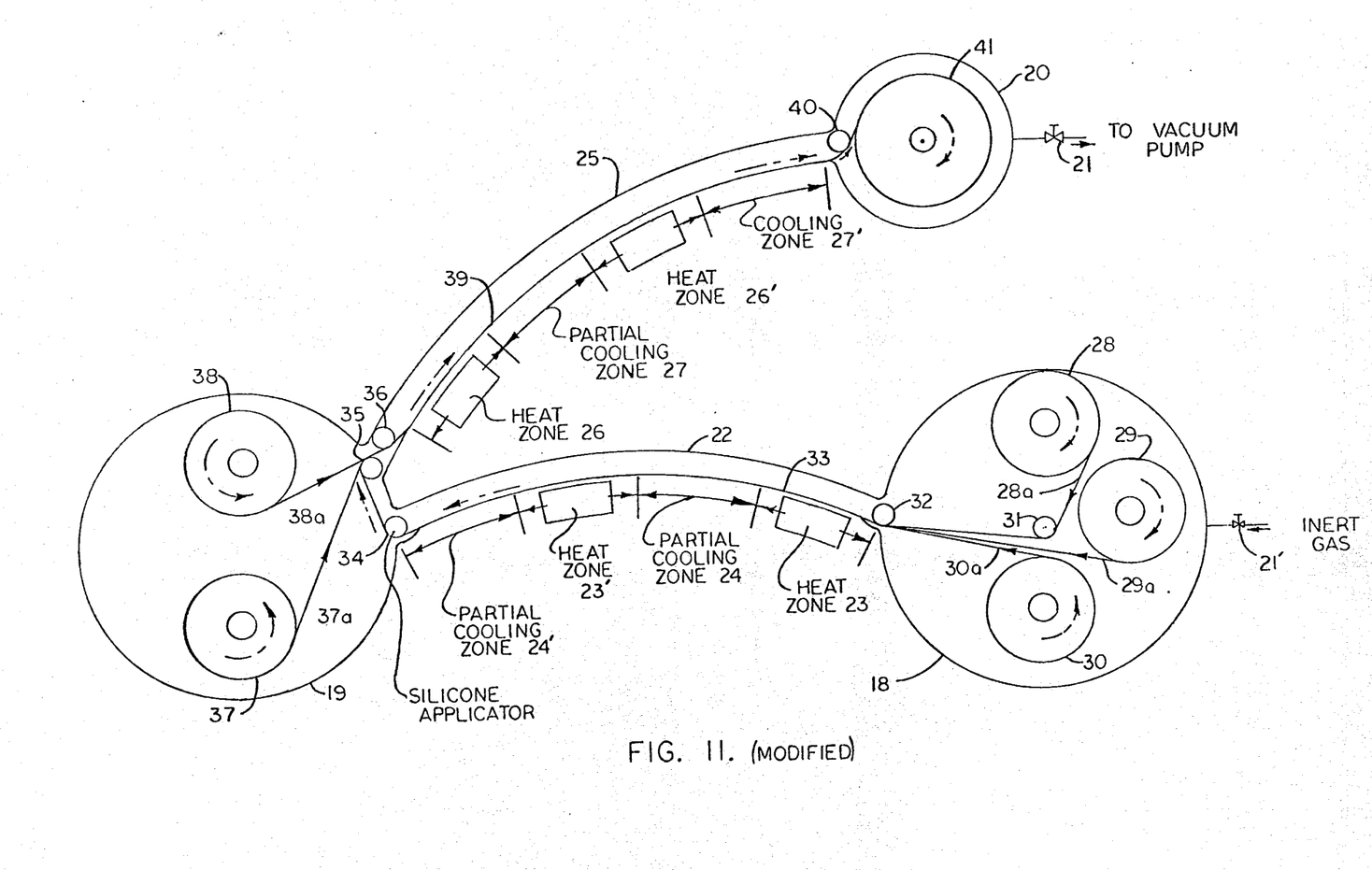
FIG. 11 is a diagrammatic view showing an apparatus for bonding one or more layers of plastic film to each surface of a flexible metal strip, said apparatus including three fluidtight vessels or containers connected by elongated heating conduits, the whole system being subjected to a suitable degree of vacuum, means being provided for passing the metal strip successively from a first vessel through a first conduit to a second vessel and thence through a second conduit to a third vessel, plastic film being adapted to be supplied to opposite surfaces of the metal film in continuous operation and bonded thereto by heating under subatmospheric conditions.

10. Another object of this invention is to improve the apparatus depicted in Ser. No. 41,375 for accomplishing the objects in above (9) by insertion of additional heating and cooling zones to achieve multiple step heating, bonding and cooling for each addition of FEP film, and the addition of inert gas injection means for the system of connected containers as depicted in FIG. 11 of the present application which is a revised version of FIG. 11 of Ser. No. 41,375.

The invention will be more readily understood by reference to the accompanying drawings, largely diagrammatic in character, illustrative of the improved product and method and means for producing the same.

In the drawings.

This invention is a continuation-in-part of my application Ser. No. 311,137 filed Dec. 1, 1972 which is a continuation of my application Ser. No. 41,375 filed May 28, 1970, relating solely to Phase A of that application. Eleven of the drawings of said prior applications from Phase A, 1 to 11 inclusive, have been used herein; FIGS. 1-7, 9 and 10 without any revisions, FIG. 8 with minor revisions and now designated as FIG. 8 (modified), and FIG. 11 with appreciable revisions and now designated as FIG. 11 (modified). Much of the descriptive matter for these drawings, appearing as pages 19 to 24 inclusive in Ser. No. 41,375, has also been incorporated in this application with revisions added where needed, this appearing on succeeding pages following this page. A new teaching and drawing has been added to the list of drawings and is designated as FIG. 12.

A discussion of old FIG. 11 of Ser. No. 41,375 is in order here, since it is the most important drawing with the most changes, together with a list of such changes made in converting it to FIG. 11 (which will be described in detail in its proper sequence in the following pages) as follows:

FIG. 11 of Ser. No. 41,375 is a schematic drawing which depicts a method of continuously bonding multiple layers of FEP film to both sides of a metal strip in an environment of reduced atmospheric pressure, using heat as a sole bonding agent, in this case producing a final laminate of two bonded layers of FEP on each side of a roll of metal strip. It teaches one heating, bonding and cooling step for the final two coats of FEP, and inadvertantly, two heating, bonding and cooling steps for the first two coats of FEP film, the cooling used, in this instance, to prevent sticking of hot FEP bonded film to rollers 34 and 35, although silicone oil is added to further aid in its non-sticking to both the rollers and the support base 39 along which the laminate slides when re-heated for the 2nd two layers of FEP film. It was the method employed in this system that suggested the discovery that multiple or at least two-step heating, bonding and cooling of laminates of FEP film and metal strips could possibly produce and entrapped air-free product. Changes in FIG. 11 of Ser. No. 41,375 to convert it into FIG. 11 of the present application are as follows:

1. A second heat zone 23' and a second partial cooling zone 24' have been inserted into conduit 22 between partial cooling zone 24 and silicone applicator-roller 34.

2. A second heat zone 26' and a second cooling zone 27' have been inserted into conduit 25 between partial cooling zone 27 and guide roller 40. 3. The valved outlet 21 to vacuum pump has been moved from container 19 to container 20.

4. A valved inlet 21' for injection of inert gas has been added to container 18.

Figure 1:
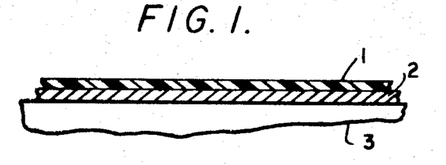
FIG. 1 is a longitudinal sectional view showing an unbonded laminate of plastic film and thin metal superposed upon a flat base; and also depicts the same after bonding.

Referring further to the drawings:

FIG. 1 shows a layer 1 of heat bondable plastic film preferably of fluorocarbon polymer, such as DuPont FEP from 0.0005 to 0.02 inch thickness superimposed on a sheet of metal 2 from 0.0012 inch upward, both layers resting on a flat base 3. The film and metal sheet appear flat, before and after bonding with heat at 450° to 600°F. in a vacuum.

Figure 2:
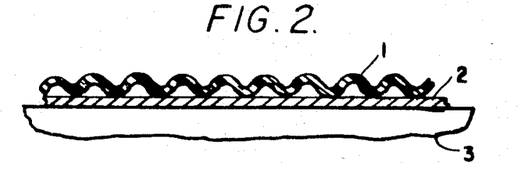
FIG. 2 is a view similar to FIG. 1 intended to illustrate the expansion and buckling of the plastic film at an intermediate state of heating in the course of bonding the laminate.

FIG. 2 shows the film 1 and metal sheet 2 of FIG. 1 at an intermediate temperature, 300° to about 450°F., when the film is at its maximum expansion prior to shrinking and bonding to the metal surface as shown in FIG. 1. Air trapped under the folds of film 1 will cause bubbles or blisters upon shrinking and bonding of the film unless the process is performed in a vacuum.

Figure 3:
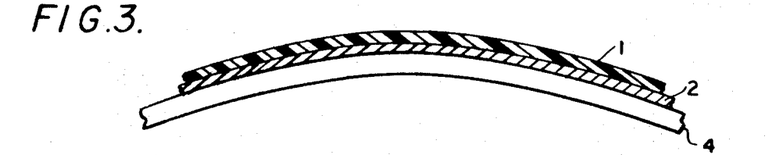
FIG. 3 is a view similar to FIG. 1 with the laminate superposed upon a convexly curved metal surface.

FIG. 3 shows a FEP film 1 superimposed on a sheet of metal 2, both in curved position over a curved base 4, the film being on a convex side of the metal sheet which is, in turn, on the convex side of the base 4. The film and the metal sheet appear this way prior to any heating and after heat bonding at a temperature of 450° to 600°F. in a vacuum.

Figure 4:
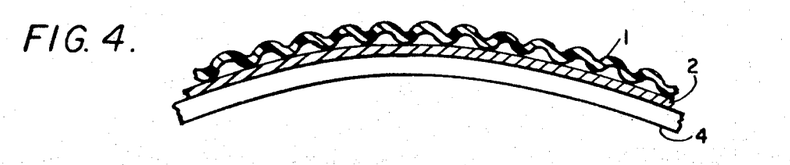
FIG. 4 is a view similar to FIG. 2 at an intermediate stage of expansion of the plastic but with the laminate superposed upon a convex surface as in FIG. 3.

FIG. 4 shows a FEP film 1 at its maximum expansion between 300° and 450°F. prior to shrinking and bonding from 450° to 600°F. as shown in FIG. 3.

Figure 5:
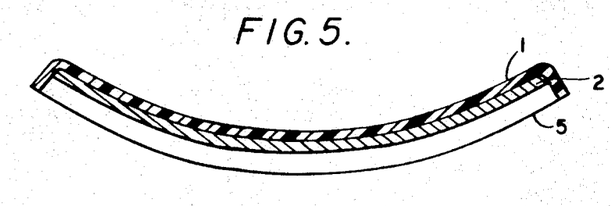
FIG. 5 is a view similar to FIG. 1 but with the unbonded laminate resting on the convace surface of a metal base.

FIG. 5 shows a FEP film 1 superimposed on metal sheet 2, touching it concave side, it in turn resting on the concave side of base 5, all prior to any heating.

Figure 6:
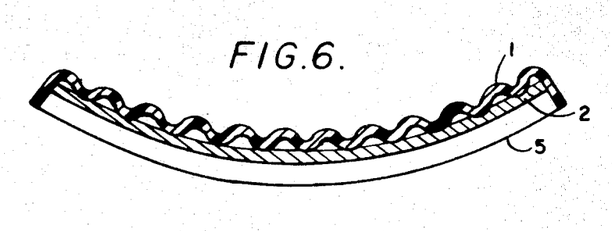
FIG. 6 is a view similar to FIG. 5 but with the plastic layer shown at its maximum expansion as in FIGS. 2 and 4.

FIG. 6 shows the FEP film 1 at its maximum expansion between 300° and 450°F. prior to shrinking from 450° to 600°F.

Figure 7:
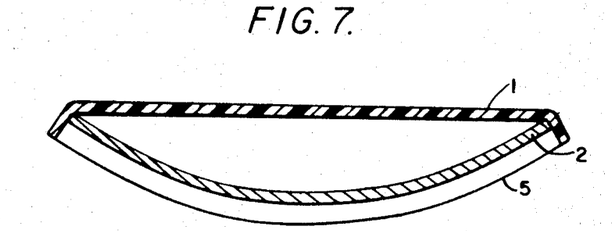
FIG. 7 is a view similar to FIG. 5 but with the plastic film shrunk and pulled away from the metal sheet.

FIG. 7 shows the FEP film 1 shrunk and pulled away from metal sheet 2 as the temperature is elevated above 300°F., failing to bond to metal sheet 2.

FIG. 8 (modified) shows a hollow cylindrical vessel 6 from which air is removed through conduit 15 to a source of vacuum (not shown). An inlet conduit 15' is provided for injection of inert gas such as nitrogen when such is required for prevention of oxidation of oxidizable metals. This vessel 6 is built to permit removal of ends 6a to permit entering, by means of flanges 16. Inside 6 is a composite roll 11' having, first, a base sheet of heavier metal (about 0.01 inch thickness) for maintaining a true coil when very thin metal sheets are to be bonded to FEP, this heavier sheet shown by numeral 11. At each end of sheet 11 is a spacer strip 12 of flexible material, about 1/16 inch thick and 1 to 2 inches wide and attached to sheet 11 with slack to allow for curving over sheet 11 when coiled. These spacer strips can be made of any suitable material such as woven asbestos tape, fibre glass or corrugated metal of similar material and thickness as the back up sheet 11. Curved over 11, between spacer strips 12 is, next, a layer of thin flexible metal 13 to be bonded to a FEP film sheet. On top of metal sheet 13 in contact with it is a thin FEP sheet 14 which is to be heat bonded to the metal strip 13. Since the combined thickness of sheets 13 and 14 is only a few mils, the space between them and the bottom side of base sheet 11 created by spacer strips 12 is ample to allow for intermediate expansion of the FEP sheet 14 when it is being brought up to bonding temperature. The composite roll 11' is held intact by pairs of curved straps 10 bolted together at flanges 17 as more fully shown in FIG. 9. The composite roll is secured to and supported by an axially extending pipe 7 which may be moved into tank 6 by means of roller supports 8. Any of several means are employable for this purpose as the fabricator might choose. The vessel may be heated in multiple steps of heating and cooling to bonding temperatures of about 550 to 650°F by any of several heating means available to those skilled in the art, as indiacted at 9.

FIG. 9 is a cross-sectional view of the composite roll 11' showing slot 16' in pipe 7 as one of several means of securing base sheet 11 to pipe 7. As in FIG. 8, 11 is the base sheet; 12 is a spacer strip; 13 is the metal sheet to be coated; 14 is the FEP film to be heat bonded to the metal sheet.

FIG. 10 is a longitudinal cross-sectional view of composite roll 11' giving more detail of the arrangement of FEP 14 on top of sheet metl 13, both on top of base sheet 11, with spacer strips 12 at each end.

FIG. 11 (modified) shows a schematic arrangement of apparatus for bonding, with heat, one or more layers of FEP film to each side of a flexible metal sheet, the whole operation carried out, without a base sheet or spacer strips, and in a substantially subatmospheric pressure or vacuum environment. The term vacuum does not mean a perfect vacuum, but sufficient vacuum to provide substantially air free bonding of the FEP film to the metal strip without use of mashing devices.

Vacuum pumps are well known in the art. Modern vacuum force pumps may produce pressure down to about 0.001 mm. of mercury. Such extreme pressures are unnecessary for the purpose of the present invention and the degree of vacuum to be employed in a given case may be determined by experimentation. Vacuums of from 18 to 26 inches of mercury are generally satisfactory. A higher degree of vacuum, while suitable, may be difficult to attain commercially, while a lower degree of vacuum may leave some air between the laminee.

Three containers, preferably metal vessels capable of withstanding a substantially complete vacuum, shown as 18, 19 and 20, are joined as shown by conduits 22 and 25. These conduits are of metal sufficiently wide to accommodate maximum width rolls to be coated about 4', sufficient depth, at least one-quarter inch, to accommodate intermediate expansion folds of the FEP film. There is, preferably, a slightly convex curve on the inside bottom of the conduits. This supports the moving metal sheet to assure convex contact of the FEP film with it, prior to bonding. A flat support would probably suffice under some circumstances, but the curved support is highly preferable. This conduit must be of sufficient strength to withstand substantially full vacuum without internal supports. Numeral 21 depicts a valved conduit leading to a source of vacuum (not shown) which imposes vacuum on the whole system. Numeral 21' depicts a valved inlet into container 18 for injection of inert gas into the system when bonding FEP film to an oxidizable metal. The system as shown will apply two layers of FEP film to each side of a flexible metal strip. The metal strip 30a from strip source shown as roll 30 in container 18 is pulled into conduit 22 underneath support roller 32 which forces it onto the curved bottom 33 of conduit 22. FEP films 28a and 29a are superimposed upon the metal sheet from rolls 28 and 29 in container 18 and are held to the metal sheet by rollers 31 and 32 which function in an unheated zone of container 18. The cool unbonded layer of metal 30a and two layers of FEP film 28a and 29a move into and through heat zone 23, heated by any of several well known means where minimal sufficient heating is effected to bond the FEP to the metal, a temperature of 500° to 525°F. It should be stated here that most rolls of flexible metal should be washed grease and dust free, with any of several well known solvents, prior to placing in container 18 as is well known to those skilled in the art. This is all to preparation needed to insure a good heat bond of the FEP to the metal. Continuing, the metal sheet 30a with the two layers 28a and 29a of FEP bonded to it on the top surfaces moves through partial cooling zone 24 where it is cooled to a temperature below 500°F, this temperature to be determined experimentally by pre-tests to determine the optimum cooling requirement for this cooling step. After this 1st step of heating, bonding and cooling, the bonded laminate with its inherent spots of unbonded FEP film and entrapped gas is re-heated in heat zone 23' to a temperature of 550°F. or more (this maximum temperature also determined by preliminary tests to determine the optimum) sufficiently to assure removal of entrapped gases through the enlarged pores of the unbonded spots of FEP prior to its shrinking and complete bonding to the metal surface. The laminate next passes through partial cooling zone 24' where it is cooled to a temperature below 500°F, sufficiently cooled to prevent sticking to guide roller-silicone applicator 34. The metal strip 30a with the two layers of bonded FEP on one side passes over guide roller 34 which also functions as a silicone applicator for coating the bonded FEP surface with silicone or the like to prevent subsequent sticking to the curved bottom 39 of the heat heating zone 26 in conduit 25. The details of the silicone applicator roller 34 are not shown as this as a common appliance known to anyone skilled in the art. It should be stated that it might require a hollow shaft, with a packing, extending outside to permit replenishing the supply of silicone oil or the like in the roller which must be perforated to supply the silicone to the FEP surface contacting it. This silicone applicator roller 34 also serves to help confine the moving strip of metal and FEP to the curved bottom 33 of conduit 22, and to direct it to the upper roller 35. Rolls 37 and 38 in container 19 supply the second two layers 37a and 38a of FEP film which are superimposed on the uncoated upper surface of the metal strip 30a at roller 35. Roller 36 functions to hold the metal strip, with its two bonded layers 28a and 29a of FEP on the underside now coated with a film of silicone oil or the like and its two new layers 37a and 38a of unbonded FEP on the top side, to the convex side of curved bottom 39 of conduit 25, this contact with roller 36 occuring prior to entry into heat zone 26. The metal strip 30a and the four FEP layers pass through heating zone 26 where they are brought to a temperature of 500° to 525°F, the two unbonded layers of FEP 37a and 38a bonding to 30a with inherent spaces of entrapped gases and not fully bonded because of this, the silicone coating on the bottom of the composite strip preventing sticking of the already bonded FEP layers 28a and 29a to the hot curved base 39. The metal strip 30a with its two bonded layers of FEP on each side is passed through partial cooling zone 27 where it is cooled to a temperature less than 500°F. It then passes through a final heat zone 26' where it is heated and maintained at a temperature of 550° to 650°F for sufficient time to assure substantially total removal of entrapped gases and effect a maximum bonding of all four FEP strips on the metal strip, two on each side. The exposure time at this final bonding temperature should also be pre-determined for the particular types of FEP film and metal strip to be bonded, it, however, having been found that less than an hour usually suffices. The metal strip 30a with its two bonded layers of FEP on each side is then passed through final cooling zone 27' where it is cooled sufficiently, below 300°F, to a non-sticking state. It leaves cooling zone 27' to pass under guide roller 40 which serves to confine it to the bottom 39 and also to direct the finished strip onto roll 41 in container 20.

Figure 12:
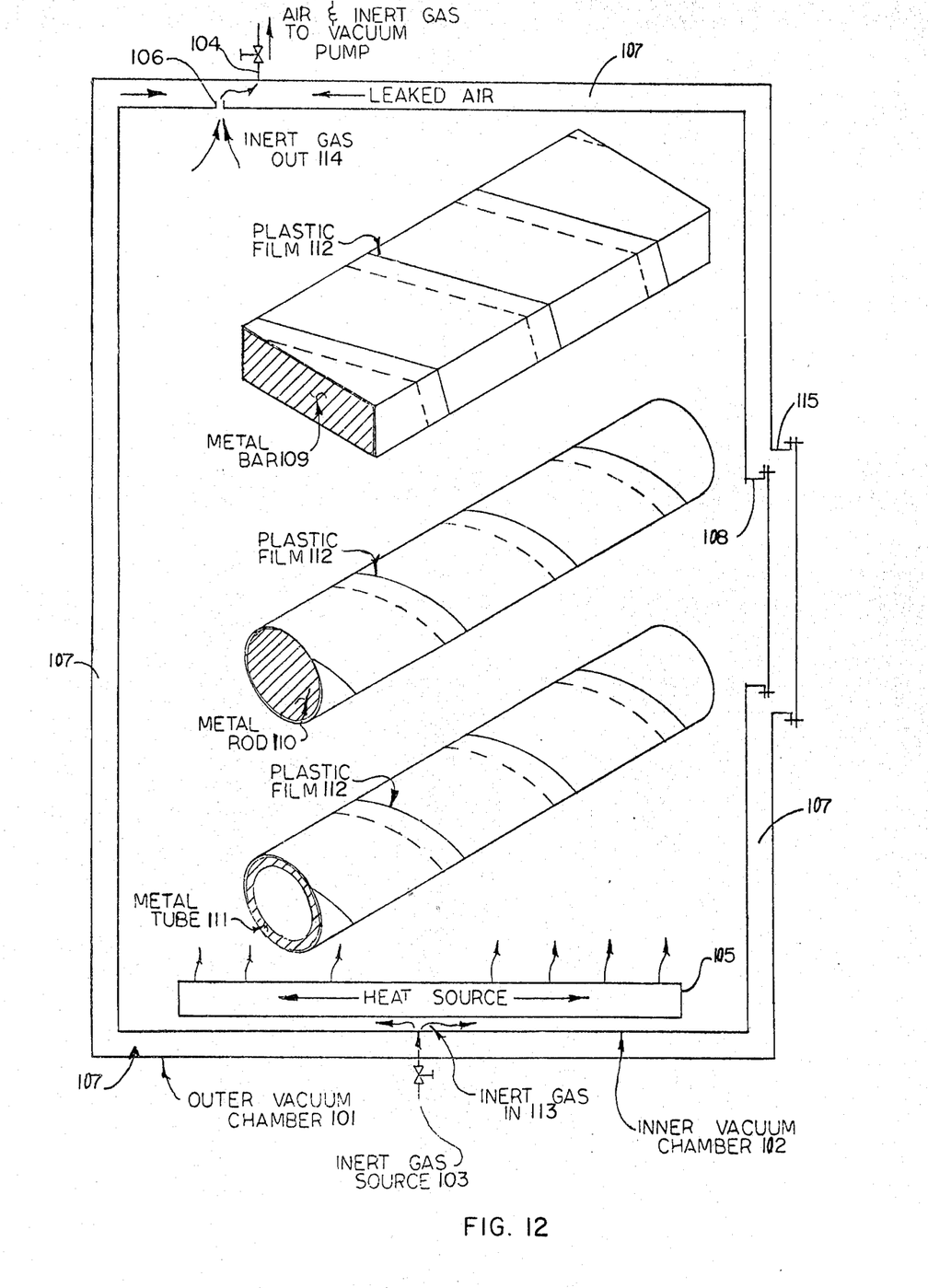
FIG. 12 is a schematic or diagrammatic drawing for a heating device for application of plastic film to metal surfaces of bars, rolls, tubes and the like, said device including an inner and outer vacuum chamber and a heating source within the chamber and valve inlet and outlet conduits for inert gas connected to the inner chamber.

FIG. 12 is an entirely new drawing for this application and may be described as follows: Although it shows a basic apparatus or structural arrangement, it is primarily schematic since its components are simple and well known to those familiar with the art with omission of such well known instruments as pressure gauges, sampling connections, and thermometers or other heat measuring instruments that would suggest their use and location where desired to one skilled in the art. It depicts what is believed to be a novel method of assuring zero oxygen or other oxidizing gases presence or contact with a metal subject to oxidation at the heat bonding temperature of a plastic film material being bonded to the surface of such a metal in an environment of reduced pressure, without application of pressure to the outer surface of the heated plastic film and without the use of bonding additives. Since most of the fluorocarbons have comparatively high softening temperatures that could pose oxidizing conditions for some commonly used metals, this method was conceived, primarily, for high temperature bonding of FEP fluorocarbon film to oxidizable metals. For way of example FIG. 12 depicts three different shapes of metallic objects such as a bar, a rod, and a tube, all with spiral wrapped plastic film around them. A portion of metal sheet, plate or wire would be treated similarly, as could any metal object small enough to be placed in the heating inner vacuum chamber. If FEP film is to be bonded, only the flat or convex surfaces of the material are suitable for such heat bonding. Other types of suitable plastics tend to soften and adhere to a concave surface if so arranged that gravity is used to bring it into contact with such surface. FIG. 12 teaches the use of an inner vacuum chamber situated within an outer vacuum chamber containing a source of heat within the inner vacuum chamber into which said chamber an inert gas is injected, preferably adjacent the heat source in order to pre-heat the inert gas, maintaining a slightly greater pressure in the inner chamber than that in the outer chamber as the inert gas flows from the inner to the outer chamber. The inner chamber contains the metallic objects or materials to be heat bonded to a plastic film. The outer vacuum chamber acts as a housing for the inner vacuum chamber, the space between it and the inner chamber serving as a conduit for outside air leakage together with inert gas from the inner chamber which pass to a vacuum source outside the outer chamber, this space functioning also as heat insulation for the heated inner chamber. Two separate sealable openings, one for each chamber, as arranged, permit access to the inner chamber when the system is not in operation preventing exposure of its sealed opening to atmosphere and possible air leaks when the system is in operation. The pressure differential between the inner and outer chambers is governed by the volume rate of inert gas injected and the size of opening or openings connecting the two chambers, together with the volume capacity of the source of vacuum. Details of FIG. 12 are as follows: 101 denotes the outer vacuum chamber, 102 is the inner vacuum chamber, 103 is a valved inlet to inner chamber 102 for injection of inert gas, 104 is a valved outlet from outer chamber 101 which conveys the mixture of leaked-in air and discharged inert gas to a vacuum pump (not shown); 105 is a heat source located within inner chamber 102 adjacent to the incoming inerg gas; 106 is an inert gas outlet from inner chamber 102 to outer chamber 101; 107 denotes the space between the two chambers which serves as a conduit for passage of leaked-in air to outlet 104 and as heat insulation between the two chambers, and also serves as a conduit for discharged inert gas passing from inner chamber 102 through outlet 106 and on to outlet 104; 108 denotes any type of sealed opening for entry to inner chamber 102 and is accessible to sealed opening 115 into outer chamber 101; 109 denotes a metal bar with a spiral wrap of plastic film 112 (FEP or other plastic); 110 is a metal rod with a spiral wrap of plastic film (FEP or other plastic); 111 is a metal tube with a spiral wrap of plastic film (FEP or other plastic); 112 denotes a plastic film that is heat bondable to metals, (FEP or other); 113 denotes an inert gas inlet zone in inner chamber 102 adjacent heat source 105; 114 is an inert gas outlet zone in chamber 102; 115 is any type of sealed opening for access to chamber 101, providing direct access, also, to sealed opening 108 of chamber 102.

The method of operation as depicted by FIG. 12 for bonding FEP film to a metal surface that is oxidizable at the bonding temperatures of the film, is as follows:

The metallic object or material to be heat bonded, with the FEP film placed on all flat or convex surfaces to be bonded thereto in a manner suggested to those skilled in the art and appropriate to the particular configuration involved, is placed in inner chamber 102 through openings 115 and 108, after which they are firmly sealed. Both chambers, are then evacuated by a vacuum pump to an optimum vacuum pressure; inert gas injection is then begun into chamber 102, this injection continuing throughout the whole operation until the product is finally cooled before removal from the oven or inner chamber 102 wherein, after sufficient sweeping and diffusion action has assured complete purging of any original air by the inert gas in inner chamber 102, heat is first applied to begin the multiple steps of heating, bonding and cooling of the FEP film and metallic surface. The injection rate of the inert gas will govern the time required for complete purging of air, this to be determined as the operator skilled in the art might choose. Although not shown, since sampling devices are well known to industry, such a sampling device could be installed to remove samples as desired from inert gas outlet zone 114 of chamber 102 for analyzing for oxygen content to assure the complete purging of oxygen from chamber 102. Assuming that vacuum suction at outlet 104 is continuously applied during the complete operation required for bonding, the pressure inside inner chamber 102 will always be greater than that in outer chamber 101 since the flow is from 102 to 101, thus assuring no entry of leaked in air to chamber 102. This pressure differential between the two chambers need be only very slight, and will be governed, mainly, by the size of outlet 106, the volume of inert gas injected into chamber 102 and the internal pressures of the two chambers 101 and 102. Determination of internal pressures and temperatures in the system may be accomplished in several manners known to those skilled in the art, such instrumentation not being shown in this disclosure. The inert gas may be adequately pre-heated by introducing it near and in contact with the heating source 105, prior to contacting it with the plastic film-metal surface combination, though it is not essential, but is quite useful to aid in providing uniform application of heat to the said combination. As a means of introducing supplemental heat with that from heat source 105, the inert gas may well be heated (not shown) prior to injection into chamber 102. Though previously mentioned, it should be emphasized that no heat should be applied until it is certain that all oxygen is purged from chamber 102 to assure that no oxidation of metal surfaces may occur, and in like manner, the bonded combination of plastic film and metallic object or material should be allowed to cool to a temperature well below the oxidizing temperature of the metal before any exposure to atmospheric conditions. It should be noted herein that no pressure is applied to the outer surface of a film such as FEP when it is heated and expanded, even with the spiral wrap arrangement as shown in FIG. 12, as the overlapping layer of FEP film is also expanded and thereby exerts no pressure on the layer beneath, thus assuring a superior, uninhibited bond as taught in my application Ser. No. 41,375. If securing means such as wire are required (not shown) in limited areas to hold the unbonded film in place until heat bonded, they should be very loosely applied, offering minimum confinement of the FEP film during its expansion stage, such wires also expanding and maintaining their original looseness as the temperature is increased. This same method as depicted in FIG. 12 is also adaptable to a system for superposing the FEP film onto the metal surface within the vacuum system as is shown and described in FIG. 11 (modified). The three container system connected by conduits as shown in FIG. 11 (modified) would simply require an outer chamber fully surrounding such system, such configuration suggesting itself to those skilled in the art. It should be noted that in such a system where the film is applied within the vacuum system, the full purging of air from the system would be simpler and easier, with no air spaces between the film and metal surface to be purged by diffusion, though many metallic objects and configurations do not lend themselves suitable for such an operation, requiring application of the film to the object prior to placing in the vacuum oven.

ADVANTAGES OF INVENTION

Since this invention is a modification of that taught in my pending application Ser. No. 41,375, still employing the same basic concepts, but offering very major improvements in the quality of the product, the same advantages over prior art as disclosed in No. 41,375 also exist herein, together with the enhancement provided by this novel teaching. Some of its advantages over the prior art, and mainly over that of my prior application Ser. No. 41,375, are as follows:

1. For all practical purposes the bonded film is completely free of blisters or unbonded spots between it and the metal surface, all entrapped gases being removed, still possessing maximum bond strength, and bonded without application of pressure to the outer surface of the heated film and without the use of bonding additives.

2. The FEP film is uniformly and completely bonded to the metal surface achieving a maximum bond strength by use of maximum bonding temperatures, without ruptures in the film which plague all other known processes and methods (including my Ser. No. 41,375) where such maximum bonding temperatures are required.

3. All of the economies in equipment design, simpler vacuum pumps, and operating costs inherent in medium vacuum operation over very high vacuum operation are provided in this novel improvement.

4. This new method, wherein the entrapped gases are released through expanded pores of the unbonded portions of FEP film when heated and bonded in a 2nd step, performed under conditions of moderately reduced environmental pressure, permits design of a practicable system for continuously bonding a FEP plastic film to a moving, flexible metal strip as depicted in FIG. 11 (modified), whereas, though theoretically possible, it was difficult to accomplish as taught in my Ser. No. 41,375 because of the very high vacuum required to produce a product that still had a certain amount of film ruptures or pockets of entrapped gases.

5. This method permits bonding of comparatively wide (up to 48 inches) strips of FEP film to metal surfaces without application of pressure to the outer surface of the film and without the need of cementing additives, wherein no gases are entrapped, such gases escaping through enlarged pores of the unbonded portion of the FEP film when heated in the 2nd heating, bonding and cooling step, whereas in all former art (including my Application Ser. No. 41,375) the gases must escape from an edge of the unbonded film or force their way out by rupturing the film if high strength bonding temperatures are employed. A large area of film does not lend itself to the full escape of gases from thereunder.

6. The use of moderate vacuum pressures, permissible only in a system as herein disclosed where strong, complete bonding of FEP film is achieved, permits the use of inert gas as a reduced pressure environment to minimize heat oxidation of oxidizable metals, thereby achieving a maximum bonding with no blisters or film ruptures.

7. Some advantages of the novel dual chamber oven as depicted in FIG. 12 are as follows:
   a. Such oven assures an absolutely oxygen free environment for the oxidizable metal object or material being bonded by heat to FEP or other type of film.

b. A dual oven can tolerate appreciable air leaks without oxygen contamination of the heat bonding process, by constant and complete removal of air from the outer chamber as fast as it enters, fully by-passing the inner vacuum-heating chamber.

c. The improved oven permits a more intricate design for the inner chamber since its internal and external pressures are nearly equal, whereas the outer chamber may have a simpler design to withstand moderate to high compressive pressures.

d. Such oven also permits the outer chamber to act as a heat insulator for the inner chamber, by virtue of the partial vacuum space between the walls of the two chambers.

e. The use of dual chambers permits use of far lesser amounts of inert gas than a single chamber system, still achieving total oxygen elimination.

8. In summation, in light of existing art discovered to date, the methods of heat bonding a fluorocarbon film such as DuPont FEP to a metal surface without application of pressure to the outer surface of the film while heated and without use of bonding additives, as taught in my application Ser. No. 41,375 and herein, is unique for economically producing a blister-free, rupture-free, maximum strength, and complete such bond.

I claim:

1. Apparatus for bonding a plastic film to a metal surface comprising a fluid-tight closed system including first, second and third fluid-tight containers or vessels, a first fluid-tight conduit connecting the first and second containers and a second fluid-tight conduit connecting the second and third containers, means for supplying vacuum to the entire system including the containers and conduits, a continuous roll for supplying thin sheet metal mounted within the first container, means for passing the strip of metal continuously from the first container through the first conduit to the second container then through the second conduit to the third container, means for supplying at least one layer of plastic film to one side of the metal strip from the first container and means for passing it with the metal strip through the conduits and second container to the third container, means within the second container for supplying at least one layer of thin plastic film to the other side of the metal strip, means for passing the same with the metal strip to the third container and heating means including first and second heating members for applying heat to the first and second conduits respectively, sufficient to bond the plastic film to the metal sheet.

2. Apparatus as defined in claim 1 including a non-stick coating applicator.

3. Apparatus as defined in claim 1 including a silicone applicator.

4. Apparatus as defined in claim 1 wherein the silicone applicator is located at the junction of the first conduit and the second container and functions to supply silicone coating to the bonded plastic surface to prevent sticking to the bottom of the next heating zone in the second conduit.

5. Apparatus as set forth in claim 1 which includes a partial cooling zone beyond the first heating member.

6. Apparatus as set forth in claim 1 which includes a cooling zone beyond the second heating member.

7. Apparatus as set forth in claim 1 which includes cooling zones beyond the first and second heating members respectively.

8. Apparatus as set forth in claim 1 which includes means for supplying an inert gas to the system.

9. Apparatus as set forth in claim 1 wherein the means for supplying vacuum comprises a vacuum pump connected with the third container or vessel, and means for supplying an inert gas to the first container or vessel.

10. Apparatus as set forth in claim 1 wherein the heating zone includes spaced heating members for each of said conduits and cooling zones beyond each heating member.

11. Apparatus as set forth in claim 1 wherein means are provided for introducing an inert gas to the system at a point remote from the means for supplying vacuum to the system.

* * * * *